United States Patent [19]

Horie et al.

[11] Patent Number: 4,738,438
[45] Date of Patent: Apr. 19, 1988

[54] MACHINE VISE WITH CLAMPING FORCE DETECTOR

[75] Inventors: Takao Horie, Gifu; Syoichi Sakai, Kakamigahara, both of Japan

[73] Assignee: Nabeya Iron & Tool Works, Ltd., Gifu, Japan

[21] Appl. No.: 944,853

[22] Filed: Dec. 22, 1986

[30] Foreign Application Priority Data

Dec. 27, 1985 [JP] Japan .............. 60-204743[U]

[51] Int. Cl.⁴ .............................................. B23Q 3/02
[52] U.S. Cl. .................................. 269/136; 269/244; 269/329; 73/862.49
[58] Field of Search ................ 269/134–138, 269/244, 240, 241, 285, 329; 254/29 A; 73/862.31, 862.65, 862.49, 761

[56] References Cited

U.S. PATENT DOCUMENTS

| | | | |
|---|---|---|---|
| 3,461,715 | 8/1969 | Stover, III | 73/862.65 |
| 3,520,182 | 7/1970 | Kelk et al. | 73/862.65 |
| 3,696,412 | 10/1972 | Swanson | 73/761 |
| 4,089,216 | 5/1978 | Elias | 73/862.31 |
| 4,098,500 | 7/1978 | Lenz | 269/136 |
| 4,223,879 | 9/1980 | Wolfe et al. | 269/136 |
| 4,299,377 | 11/1981 | Lenz | 269/244 |

FOREIGN PATENT DOCUMENTS 613586 6/1983 Japan .

Primary Examiner—Robert C. Watson
Attorney, Agent, or Firm—Parkhurst & Oliff

[57] ABSTRACT

A machine vise for clamping a workpiece between a stationary jaw fixed to a body, and a movable jaw provided on a movable member which is moved relative to the body by a rotating motion of a feedscrew member which is rotatably supported by a support portion formed on one of the body and the movable member, the feedscrew member having an externally threaded portion engaging an internally threaded member provided fixedly to the other of the body and the movable member. The feedscrew member includes a radially outwardly extending flange portion which prevents the feedscrew member from moving in the axial direction relative to the support portion, due to a reaction force which is produced upon clamping of the workpiece. The machine vise includes a strain detector device disposed between the support portion and the flange portion of the feedscrew member, for detecting an axial force which is exerted on the support portion via the flange portion and the detector device due to the reaction force. The detector device generates an output signal that indicates the axial force and consequently a clamping force of the workpiece.

9 Claims, 1 Drawing Sheet

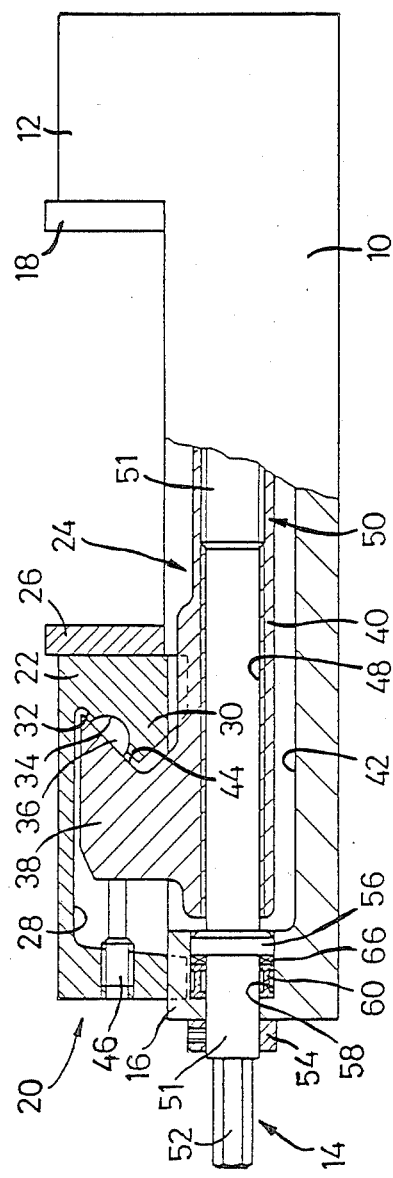
FIG. 1
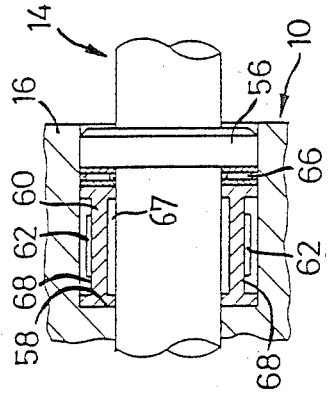
FIG. 3
FIG. 2

MACHINE VISE WITH CLAMPING FORCE DETECTOR

BACKGROUND OF THE INVENTION

1. Field of the Invention

The present invention relates generally to a machine vise for clamping a workpiece, and more particularly a machine vise equipped with a device for detecting a clamping force exerted on the workpiece.

2. Discussion of the Prior Art

A commonly known machine vise has (a) a body having a stationary jaw fixed thereto, (b) a movable member having a movable jaw fixed thereto, and movable relative to the body, (c) a support portion formed on one of the body and the movable member, (d) an internally threaded member provided fixedly to the other of the body and the movable member, and (e) a feedscrew member rotatably supported by the support portion, and engaging the internally threaded member, for moving the movable member relative to the body by a rotating motion thereof, to clamp a workpiece between the stationary jaw of the body and the movable jaw of the movable member.

A conventional machine vise is not equipped with a device which indicates a clamping force which is actually exerted on the workpiece between the stationary and fixed jaws. The optimum clamping force that should be applied to the workpiece differs depending upon the specific material and configuration of the workpiece, and upon the particular type of work to be performed on the workpiece. However, the clamping force on the conventional machine vise is determined by his expertise or operator, relying upon the experience. Accordingly, the clamping force applied the workpiece may be excessive or insufficient, resulting in damaging the workpiece, or a failure to machine or otherwise process the workpiece as contemplated.

In light of the above inconvenience, the assignee of the present application proposed a machine vise wherein one of the stationary and movable jaws is equipped with a detector device for sensing the clamping force acting on the workpiece, as disclosed in Publication No. 61-3586 (published for opposition purpose) of Japanese Utility Model Application. In the proposed arrangement, the clamping force may be easily adjusted based on the value obtained by the detector device, whereby the conventionally experienced inconveniences of excessive or insufficient clamping of the workpiece may be suitably avoided.

More specifically described, the detector device consists of a pair of generally cylindrical, parallel strain members which are elastically deformable when subjected to an axial force applied thereto upon clamping of the workpiece between the stationary and movable jaws via respective mouthpieces. Each of the strain members is provided with a strain gage bonded thereto. The strain members are substantially entirely accommodated within parallel holes formed in the movable jaw, such that the strain members are secured at their one end to the movable jaw while their other end is held in abutting contact with the mouthpiece for the movable jaw. In this arrangement, the mouthpiece for the movable jaw must be disposed so that the mouthpiece is movable relative to the movable jaw in the clamping direction, in order to permit the strain members to be elastically deformed when the workpiece is clamped. Therefore, it has been difficult to provide this type of arrangement on a highly precise machine vise which requires high levels of parallelism between the mouthpieces for the stationary and movable jaws, and squareness of the mouthpieces to the clamping direction (to the top surface of the body on which the movable member is slidably moved). In a machine vise wherein mouthpieces are connected to the jaws so as to permit relative movement, there is a tendency to produce a reaction, force as a result of clamping the workpiece which is unevenly exerted to the clamping surfaces of the mouthpieces, with local portions of the mouthpieces being subjected to a greater forces than the other portions. Consequently, the parallelism of the mouthpieces, and their squareness to the clamping direction tend to be easily deteriorated. Namely, machine uses requiring high degrees of such parallelism and squareness of the mouthpieces proposed has made use of structures such as the detector device difficult.

Further, uneven distribution of the reaction force on the mouthpiece for the movable jaw causes different magnitudes of elastic deformation or strain of strain members disposed between the mouthpiece and the movable jaw, thereby lowering the sensing accuracy or reliability of the detector device.

SUMMARY OF THE INVENTION

It is therefore an object of the present invention to provide a machine vise which has a device for accurately detecting a clamping force on the workpiece, without deteriorating the parallelism and squareness of the mouthpieces.

The above object may be achieved according to the present invention, which provides a machine vise for clamping a workpiece between a stationary jaw and a movable jaw, including (a) a body having said stationary jaw fixed thereto; (b) a movable member having the movable jaw fixed thereto, and being movable relative to the body, (c) a support portion formed on one of the body and the movable member; (d) an internally threaded member provided fixedly to the other of the body and the movable member, and (e) a feedscrew member rotatably supported by the support portion, and engaging the internally threaded member, for moving the movable member relative to the body by a rotating motion thereof, to clamp the workpiece between the stationary jaw of the body and the movable jaw of the movable member, wherein the feedscrew member comprises a radially outwardly extending flange portion which prevents the feedscrew member from moving in an axial direction relative to the support portion, due to a reaction force which is produced upon clamping of the workpiece by the rotating motion of the feedscrew member with the externally threaded portion thereof engaging the internally threaded member, and in that detecting means is disposed between the support portion and the flange portion of the feedscrew member, for detecting an axial force which is exerted on the support portion via the flange portion and the detecting means due to the reaction force. The detecting means generates an output signal indicative of the axial force, whereby a clamping force of the workpiece is detected based on the output signal, according to a predetermined relation between the clamping force and the axial force.

In the machine vise of the present invention constructed as described above, an axial force corresponding to the clamping force acting on the workpiece is produced between the flange portion of the feedscrew member and the support portion. Since this axial force is sensed by the detecting means, the clamping force which currently acts on the workpiece may be determined based on the output signal generated by the detecting means. Accordingly, the clamping force may be adjusted to an optimum level which suits the specific material, configuration and working condition of the workpiece. Thus, the detecting means is effective for avoiding an excessive or insufficient clamping force, which may cause damages of the workpiece, or improper working of the workpiece due to loose clamping. Further, the prevention of an unnecessarily large clamping force of the workpiece contributes to an increase in the life expectancy of the vise, i.e., to maintenance of the desired accuracy for a prolonged period of time.

Unlike the known detector device as disclosed in the prior art document previously identified, the detecting means of the instant machine vise is disposed between the radially outward flange of the feedscrew member and the support portion for rotatably supporting the feedscrew member. Therefore, the detecting means does not require an undesirable arrangement wherein a mouthpiece is supported movably relative to the movable jaw. In other words, the mouthpiece for the movable jaw of the instant machine vise may be fixed to the movable jaw, which ensures higher levels of parallelism of the mouthpieces for the movable and stationary jaws, and squareness of the mouthpieces to the direction in which the workpiece is clamped. Thus, the instant arrangement of the detecting means permits the machine vise to maintain its initial accuracy for a sustained period of time.

In the present arrangement, the axial force applied between the flange portion of the feedscrew member and the support portion for the feedscrew member is less likely to be affected by the clamping condition of the workpiece. Stated differently, the axial force sensed by the detecting means accurately reflects the clamping force which actually acts on the workpiece. Since there exists a relationship between the actual clamping force and the sensed axial force, it is possible to make a comparatively exact determination of the clamping force, based on the axial force represented by the output signal of the detecting means.

According to one feature of the invention, the detecting means comprises a strain member which is disposed between the flange portion of the feedscrew member and the support portion, and at least one strain gage attached to the strain member. The strain member is susceptible to a compressive strain in the axial direction due to the axial force. The strain gage generates a signal indicative of the compressive strain of the strain member.

In one form of the above feature of the invention, the strain member consists of a ring including an axially intermediate portion which has an annular groove in an inner surface thereof, and which has a plurality of cutouts formed in an outer surface thereof such that the cutouts are parallel to an axis of the ring. In this case, the strain gage may be preferably attached to at least one of the plurality of cutouts.

In another form of the above feature, the machine vise further comprises a thrust bearing disposed between the flange portion of the feedscrew member and the strain member. The thrust bearing is provided to permit the feedscrew member to be freely rotated relative to the strain member.

According to another feature of the invention, the support portion is formed on the body, while the internally threaded member is fixed to the movable member.

In one form of the above feature of the invention, the internally threaded member includes an internally threaded portion having an internal thread engaging the externally threaded portion of the feedscrew member. The internally threaded member further includes a connecting portion at which the internally threaded member is connected to the movable member. The connecting portion has a first inclined surface, while the movable member has a second inclined surface in abutting engagement with the first inclined surface, whereby a component of the axial force is imparted to the workpiece as the clamping force, through an inclined interface between the first and second inclined surfaces.

BRIEF DESCRIPTION OF THE DRAWINGS

The above and other objects, features and advantages of the present invention will become more apparent by reading the following detailed description of a preferred embodiment of the invention, when considered in connection with the accompanying drawings, in which:

FIG. 1 is a front elevational view partly in cross section of one embodiment of a machine vise of the present invention;

FIG. 2 is an elevational cross sectional view in enlargement of a part of the machine vise of FIG. 1 closely associated with the principle of the invention; and FIG. 3 is a view illustrating a strain ring shown in FIG. 2.

DETAILED DESCRIPTION OF THE PREFERRED EMBODIMENT

Referring first to FIG. 1, reference numeral 10 designates an elongate body of a machine vise embodying the concept of the present invention. The body 10 extends longitudinally from its right end (in the figure) having an integrally formed stationary jaw 12 at the top, to the left end at which a support portion 16 is formed for supporting a feedscrew shaft 14 which will be described. On a surface of the stationary jaw 12 facing toward the left end of the body 10, there is fixed a rectangular mouthpiece 18 such that the clamping surface of the mouthpiece 18 is perpendicular to the longitudinal direction of the body 10, and to the top surface of the body. While the stationary jaw 12 is an integral part of the body 10 in this embodiment, the jaw 12 may be provided as a separate part fixed to the body 10.

In FIG. 1, reference numeral 20 indicates a movable member 24 which includes a movable jaw 22 facing the stationary jaw 12, and an internally threaded member disposed below the movable jaw 22.

The movable jaw 22 is movable on the top surface of the body 10 in the longitudinal direction, and is guided by a suitable guiding structure formed on the body 10. On a surface of the movable jaw 22 facing the stationary jaw 12, another mouthpiece 26 is fixed in parallel relation with the mouthpiece 18 fixed to the stationary jaw 12.

The movable jaw 22 has an internal cavity 28 which is open at its low surface, and an inward projection 30 which protrudes into the cavity 28 from a wall on which the mouthpiece 26 is fixed. The inward projection 30 has an inclined surface 32 at its upper part. This inclined surface 32 has a hemispherical recess 34 which accommodates a hemispherical element 36 which will be described.

The internally threaded member 24 consists of an upper connecting portion 38 and a lower internally threaded portion 40, which are formed as a one-piece unitary member. The connecting portion 38 is positioned within the internal cavity 28 of the movable jaw 22, while the internally threaded portion 40 is accommodated within a void 42 formed in the body 10. The internally threaded member 24 is connected to the movable jaw 22 at the connecting portion 38, so that the movable jaw 22 and the internally threaded member 24 are movable as a unit in the longitudinal direction of the body 10.

The connecting portion 38 has an inclined surface 44 facing the inclined surface 32 on the inward projection 30 of the movable jaw 22. The inclined surface 44 has the same angle of inclination as the inclined surface 32, and is held in abutting contact with an exposed flat surface of the hemispherical element 36 whose hemispherical surface fits in the hemispherical recess 34 formed in the inclined surface 32. More specifically, the connecting portion 38 is pushed in the longitudinal direction of the body 10, by an adjustable screw 46 threaded to the movable jaw 22, such that the free end of the screw 46 is in abutting contact with a surface of the connecting portion 38 provided on the side remote from the inclined surface 44. Thus, the connecting portion 38 is fixed to the movable jaw 22.

The internally threaded portion 40 accommodated in the void 42 in the body 10 has an internal female thread 48 formed in the longitudinal direction of the body 10. This female thread 48 is in meshing engagement with an externally threaded portion 50 of the feedscrew shaft 14 which is rotatably supported at its one end by the support portion 16 previously indicated.

The feedscrew shaft 14 has a bearing portion 51 which extends through the wall of the support portion 16 of the body 10. The bearing portion 51 terminates in an operating end portion 52 located outside the body 10. The feedscrew shaft 14 is rotated by a suitable operating member connected to the operating portion 52, for operating the machine vise. To prevent the feedscrew shaft 14 from being axially displaced in the left direction (as seen in FIG. 1), the feedscrew shaft 14 has a collar 54 fixed to the outer end of the bearing portion 51 outside the body 10. This collar 54 is held in abutting contact with the outer surface of the support portion 16.

The feedscrew shaft 14 further has a flange portion 56, which protrudes in the radially outward direction from the inner end of the bearing portion 51 adjacent to the end of the externally threaded portion 51 on the side of the support portion 16. As shown in FIG. 2, the flange portion 56 is fitted in a hole 58 formed in the support portion 16, such that the flange portion 56 is slidably rotatable within the hole 58. The hole 58 has a depth which is considerably larger than the thickness of the axial wall of the flange portion 56 of the feedscrew shaft 14. As indicated in FIG. 2, the flange portion 56 closes the open end of the hole 58 remote from the wall of the support portion 16 through which the feedscrew shaft 14 extends. Thus, the bearing portion 51 and the flange portion 56 of the feedscrew shaft 14 cooperate with the support portion 16 to define an enclosed annular space (58).

Within the annular space in the hole 58, there is disposed a strain member in the form of a ring 60 fitting on the bearing portion 51 of the feedscrew shaft 14. The ring 60 is susceptible to a compressive strain in the axial direction due to an axial force applied thereto. Between the flange portion 56 and the ring 60, there is interposed a thrust bearing in the form of a needle bearing 66, so that the feedscrew shaft 14 is freely rotatable relative to the strain ring 60. In this arrangement, the axial force applied to the feedscrew shaft 14 due to a reaction force upon clamping of a workpiece between the stationary and movable jaws 12, 22 will be imparted to the support portion 16 via the flange portion 56, needle bearing 66 and the ring 60. Thus, the feedscrew shaft 14 is protected from an axial movement thereof in the left direction as viewed in FIG. 2.

As shown in FIGS. 2 and 3, an axially intermediate portion of the strain ring 60 has an annular groove 67 in its inner surface. Further, the intermediate portion also has four segmental cutouts 68 formed in its outer surface such that the cutouts 68 are parallel to the axis of the ring 60, and are equally spaced from each other (at angular intervals of 90 degrees) in the circumferential direction. The segmental cutouts 68 take the form of a segment as viewed in a transverse cross-sectional plane of the ring 60, as indicated in FIG. 3. Thus, a substantial amount of stock is removed from the strain ring 60, so that the ring 60 is more sensitive to a compressive strain due to the axial force exerted thereto.

The strain ring 60 has a pair of strain gages 62, 62 attached to the surfaces of the opposite segmental cutouts 68, as most clearly shown in FIG. 3. These strain gages 62 are adapted to detect an amount of strain of the ring 60 which corresponds to an axial force applied to the feedscrew shaft 14 upon clamping of the workpiece on the machine vise. Thus, the strain ring 60 and the strain gages 68 serve as detecting means for detecting the axial force applied between the flange portion 56 of the feedscrew shaft 14 and the support portion 16 of the body 10. This aspect of the invention will be described in greater detail.

In the thus constructed machine vise, a rotating motion of the feedscrew shaft 14 will cause the movable jaw 22 to be moved in the longitudinal direction of the body 10, toward and away from the stationary jaw 12, by means of engagement of the externally threaded portion 51 of the feedscrew shaft 14 with the internally threaded portion 40 of the internally threaded member 24 of the movable member 20. Accordingly, the workpiece may be clamped between the stationary and movable jaws 12, 22, more precisely, between the mouthpieces 18, 26 fixed thereto.

In a process of forcing the movable jaw 22 to clamp the workpiece between the two jaws 12, 22, an axial force is exerted between the flange portion 56 of the feedscrew shaft 14 and the support portion 16 of the body 10, as a reaction force which is produced as a result of the internally threaded member 30 pushing the movable member 22 through the hemispherical element 36 at the inclined interface between the inclined surfaces 32, 40. The reaction or axial force is equal to the force which acts on the movable jaw 22. This force is divided into a first component which acts on the workpiece in the longitudinal direction of the body 10 (workpiece-clamping direction), and a second component which causes the movable jaw 22 to act on the top surface of the body 10 in the direction perpendicular to the workpiece-clamping direction. The ratio of the first component to the second component is determined by the particular structure at the interface between the inclined surfaces 32, 44. Since the axial force is imparted from the flange portion 56 to the support portion 16 via the strain member 60, the output signal generated by the strain gages 62, 62 represents the axial force, i.e., the sum of the first and second components indicated above. Since the ratio of the first component force to the second component force is known, the ratio of the clamping force (which corresponds to the first component force) to the axial force applied to the strain ring 60 (sum of the first and second component forces) is also known. Therefore, the clamping force of the workpiece between the stationary and movable jaws 12, 22 can be determined based on the axial force represented by the output signal, and according to the known relationship between the clamping force and the axial force.

When the axial force or stress applied to the strain ring 60 is changed, an amount of strain of the ring 60 is accordingly changed. The change in the strain of the ring 60 causes a corresponding change in the electrical resistance of the strain gages 62, 62, which is detected by a suitable bridge circuit. The output signal generated by the strain gages 62 represents the electrical resistance, which in turn indicates the axial stress currently exerted to the strain ring 60, i.e., an axial force currently applied to the feedscrew shaft 14, as a result of reaction of the force acting on the movable jaw 22. Thus, the current clamping force of the workpiece can be determined based on the known ratio of the clamping force to the axial stress represented by the output signal of the strain gages 62.

As described above, by analyzing the output signal of the strain gages 62, the clamping force to be applied to the workpiece can be adjusted to an optimum level, depending upon the material, shape and working condition of the workpiece. The detecting means 60, 62 enables the operator to avoid the conventionally experienced inconveniences, such as insufficient clamping force that leads to poor working on the workpiece, or unnecessarily high clamping force that may damage the workpiece and that may lead to deteriorating the built-in accuracy of the vise, or shortening its life expectancy.

In the illustrated machine vise, the mouthpieces 18, 26 may be firmly secured to the respective stationary and movable jaws 12, 22. This arrangement permits comparatively high levels of parallelism between the mouthpieces 18, 26, and squareness of the same to the top surface of the body 10. In other words, the detecting means 60, 62 do not require a conventional arrangement in which the mouthpiece must be movable relative to the movable jaw, which arrangement tends to lose its built-in accuracy during use of the vise.

Further, since the strain member 60 is disposed between the flange portion 56 of the feedscrew shaft 14, and the bottom wall of the hole 58 formed in the support portion 16 of the body 10, the stress to be applied to the strain member 60 is less likely to be influenced by the clamping condition of the workpiece between the stationary and movable jaws 12, 22. Namely, the clamping force which is currently applied to the workpiece may be exactly or accurately represented by the output signal of the strain gages 62, 62, which signal is indicative of the amount of strain of the strain ring 60 (electrical resistance of the strain gages), which in turn represents the axial stress currently exerted to the strain member 60.

As is apparent from the foregoing description, the present machine vise uses only one strain member in the form of the strain ring 60 having the strain gages 62, 62 attached thereto. In other words, the machine vise is equipped with a compact, simple, inexpensive detector device 60, 62 for detecting the clamping force of the workpiece.

It is noted that the clamping force of the workpiece detected by the strain gages 62 is usually visually indicated on a suitable digital or analog indicator device attached to the body 10 or built in the body 10. Since the strain gages 62 are fixed in position, the electrical connection of the gages 62 to the indicator device is made simpler, unlike the conventional arrangement wherein the conductor wires must be disposed in a flexible manner, due to movements of the strain gages relative to the body 10. The electrical connection between the strain gages 62 and the indicator device may be made simple particularly when the indicator is built in the body 10.

While the machine vise is preferably equipped with such a visual indicator to indicate the detected clamping force of the workpiece, the visual indication is not essential. For example, the visual indicator may be replaced by an indicator light or an alarm buzzer, which is activated when the clamping force falls within an optimum range. In this case, too, the electrical connection between the indicator and the strain gages 62 is made comparatively simple, using the conductors fixed in position.

While the present invention has been described in its preferred embodiment, it is to be understood that the invention is not limited thereto, but may be otherwise embodied.

For instance, the flange portion 56 formed integrally with the feedscrew shaft 14 may be a separate member fixed to the feedscrew shaft 14 by suitable means.

While the detecting means for detecting the clamping force in the illustrated embodiment consists of the strain ring 60 and the two strain gages 62, 62, various other combinations of a strain member and strain detecting means may be utilized.

In the illustrated embodiment, the movable member 20 consists of the movable jaw 22 and the internally threaded member 24 separate from the jaw 22, it is possible that these two members may be formed as an integral one-piece body. In this case, the axial force detected by the detecting means is substantially equal to the clamping force applied to the workpiece.

Further, the present invention is also applicable to a type of machine vise wherein a feedscrew shaft is rotatably supported by a support portion formed on the movable member, while an internally threaded member engaging the feedscrew shaft is secured to the vise body 10.

It will be obvious to those skilled in the art that other changes, modifications and improvements may be made in the invention, in the light of the foregoing teachings, without departing from the spirit and scope of the invention defined in the appended claims.

What is claimed is:

1. A machine vise for clamping a workpiece between a stationary jaw and a movable jaw, comprising:
   a body having a stationary jaw fixed thereto;
   a movable member having a movable jaw fixed thereto, and movable relative to said body;
   a support portion formed on one of said body and said movable member;
   an internally threaded member provided fixedly to the other of said body and said movable member;

a feedscrew member rotatably supported by said support portion, and engaging said internally threaded member, for moving said movable member relative to said body by a rotating motion thereof, to clamp the workpiece between said stationary jaw of said body and said movable jaw of said movable member;

said feedscrew member including a radially outwardly extending flange portion which prevents the feedscrew member from moving in an axial direction thereof relative to said support portion, due to a reaction force which is produced upon clamping of said workpiece by said rotating motion of said feedscrew member with said externally threaded portion thereof engaging said internally threaded member; and means for detecting an axial force exerted between said support portion and said flange portion of said feedscrew member, said detecting means being positioned therebetween and detecting an axial force which is exerted on said support portion via said flange portion and said detecting means due to said reaction force, said detecting means generating an output signal indicative of said axial force, whereby a clamping force of said workpiece is detected based on said output signal, according to a predetermined relation between said clamping force and said axial force.

2. A machine vise according to claim 1, wherein said detecting means comprises a strain member which is disposed between said flange portion of said feedscrew member and said support portion and which is susceptible to a compressive strain in said axial direction due to said axial force, and at least one strain gage attached to said strain member, said at least one strain gage generating said output signal, which is indicative of said compressive strain of said strain member.

3. A machine vise according to claim 2, wherein said strain member consists of a ring including an axially intermediate portion which has an annular groove in an inner surface thereof, and which has a plurality of cutouts formed in an outer surface thereof, said cutouts being parallel to an axis of said ring.

4. A machine vise according to claim 3, wherein said at least one strain gage is attached to at least one of said plurality of cutouts.

5. A machine vise according to claim 2, further comprising a thrust bearing disposed between said flange portion of the feedscrew member and said strain member, said thrust bearing permitting said feedscrew member to be freely rotated relative to said strain member.

6. A machine vise according to claim 1, wherein said support portion is formed on said body, while said internally threaded member is fixed to said movable member.

7. A machine vise according to claim 6, wherein said internally threaded member includes an internally threaded portion having an internal thread engaging said externally threaded portion of said feedscrew member, said internally threaded member further including a connecting portion at which said internally threaded member is connected to said movable member, said connecting portion having a first inclined surface, and said movable member having a second inclined surface in abutting engagement with said first inclined surface, whereby a component of said axial force is imparted to said workpiece as said clamping force, through an inclined interface between said first and second inclined surfaces.

8. A machine vise for clamping a workpiece between a stationary jaw and a movable jaw, comprising;
a body having a stationary jaw fixed thereto;
a movable member having a movable jaw fixed thereto, said movable member being movable relative to said body;
a support portion formed on one of said body and said movable member;
an internally threaded member fixed to the other of said body and said movable member;
a feedscrew member rotatably supported by said support portion, and engaging said internally threaded member, for moving said movable member relative to said body by a rotating motion thereof, to clamp the workpiece between said stationary jaw of said body and said movable jaw of said movable member;

said feedscrew member including a radially outwardly extending flange portion which prevents the feedscrew member from moving in an axial direction thereof relative to said support portion, due to a reaction force which is produced upon clamping of said workpiece by said rotating motion of said feedscrew member with said externally threaded portion thereof engaging said internally threaded member; and means for detecting an axial force exerted between said support portion and said flange portion of said feedscrew member, said detecting means being positioned there between and detecting an axial force which is exerted on said support portion via said flange portion and said detecting means due to said reaction force, said detecting means comprising a strain member which is susceptible to a compressive strain in said axial direction due to said axial force, and at least one strain gage attached to said strain member which generates an output signal indicative of said compressive strain of said strain member, said strain member consisting of a ring including an axially intermediate portion which has an annular groove in an inner surface thereof, and which has a plurality of cutouts formed in an outer surface thereof, said cutouts being parallel to an axis of said ring, whereby a clamping force of said workpiece is detected based on said output signal, according to a predetermined relation between said clamping force and said axial force.

9. A machine vise for clamping a workpiece between a stationary jaw and a movable jaw, comprising:
a body having a stationary jaw fixed thereto;
a movable member having a movable jaw fixed thereto, said movable member being movable relative to said body;
a support portion formed on one of said body and said movable member;
an internally threaded member fixed to the other of said body and said movable member;
a feedscrew member rotatably supported by said support portion, and engaging said internally threaded member, for moving said movable member relative to said body by a rotating motion thereof, to clamp the workpiece between said stationary jaw of said body and said movable jaw of said movable member;

said feedscrew member including a radially outwardly extending flange portion which prevents the feedscrew member from moving in an axial direction thereof relative to said support portion, due to a reaction force which is produced upon clamping of said workpiece by said rotating motion of said feedscrew member with said externally threaded portion thereof engaging said internally threaded member; and means for detecting an axial force exerted between said support portion and said flange portion of said feedscrew member, said detecting means being positioned there between and detecting an axial force which is exerted on said support portion via said flange portion and said detecting means due to said reaction force, said detecting means comprising a strain member which is susceptible to a compressive strain in said axial direction due to said axial force, and at least one strain gage attached to said strain member which generates an output signal indicative of said compressive strain of said strain member, said strain member comprising a ring including an axially intermediate portion which has an annular groove in an inner surface thereof, and which has a plurality of cutouts formed in an outer surface thereof, said cutouts being parallel to an axis of said ring, whereby a clamping force of said workpiece is detected based on said output signal, according to a predetermined relation between said clamping force and said axial force.

* * * * *